Figure 1:
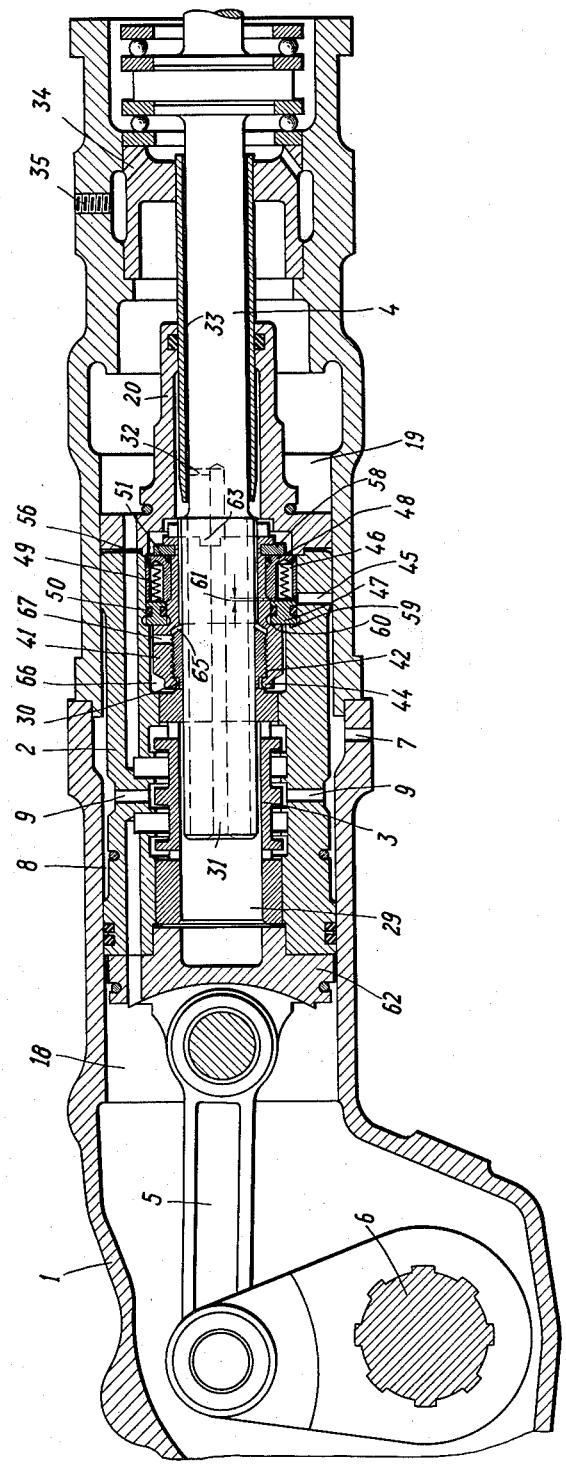

March 21, 1961 E. JABLONSKY 2,975,764
AUXILIARY POWER STEERING FOR MOTOR VEHICLES
Filed Jan. 30, 1959 2 Sheets-Sheet 2

United States Patent Office 2,975,764
Patented Mar. 21, 1961

2,975,764

AUXILIARY POWER STEERING FOR MOTOR VEHICLES

Erich Jablonsky, Schwabisch Gmund, Germany, assignor to Zahnradfabrik Friedrichshafen, Aktiengesellschaft, Friedrichshafen am Bodensee, Germany Filed Jan. 30, 1959, Ser. No. 790,115

Claims priority, application Germany Feb. 1, 1958

8 Claims. (Cl. 121—42)

This invention relates to auxiliary power steering and more particularly to power steering effected by oil pressure and controlled by rotation of the steering wheel.

It is an object of the invention to provide a rugged and economical power steering device.

It is another object of the invention to provide a power steering device having a compact construction and a minimum of moving parts.

It is a further object of the invention to provide a power steering device which will provide a reaction to the steering wheel so that the driver can have so-called "road feel."

It is an additional object of the invention to provide a power steering device wherein there will be no steering "creep" due to unbalance in the mechanism; that is, a system wherein the front wheels will have no tendency to be steered inherently when the steering wheel is in neutral or straight forward position.

The present invention constitutes an improvement over my prior application, Serial No. 661,357, filed May 24, 1957, now Patent No. 2,941,514, and assigned to the same assignee.

In the prior application a straight forward or neutral position of the vehicle wheels was achieved by means of balancing a double-acting piston so as to provide equal pressures on both sides of the piston to maintain it in a fixed position so as not to actuate the linkage which effected steering movement. Such balancing was necessary due to the fact that one end of the piston had a greater area than the other end, the other end area being lessened by the presence of a steering rod manipulated by a steering wheel which steering rod inherently diminished the effective area on which pressure could act. Such balancing was brought about by the use of disks of various thickness used in conjunction with apertures of a sleeve valve, which sleeve valve was actuatable by the steering rod so as to direct pressure to one end or the other of the piston to produce power steering by motion of the piston. The arrangement of disks of different thicknesses produced a pressure drop at the large area end of the piston so that the total net pressure acting on the ends of the piston was equalized. While operative in a circulatory oil system, such an arrangement has a disadvantage in that considerable precision of the dimensions of the disks is necessary. Thus, the use of such disks is expensive. The present invention provides a simpler and more economic arrangement by having a collar carried by the piston and fixed thereto, which collar has a threaded connection with the sleeve valve which controls flow to the ends of the piston so as to hold the valve in a fixed position whereby the circulating oil has a greater drop of pressure in moving toward one end of the piston than the other. Thus, differential pressures are achieved to compensate for differential areas at the piston ends, whence the piston is balanced.

In carrying out the invention I prefer to secure the adjustable sleeve to the power piston so that it is movable in either longitudinal direction against the fixed stops carried by the piston by biasing in one direction by means of springs. The springs are carried in what might be termed a reaction chamber which is maintained at inlet oil pressure at all times, the construction being so arranged that the pressure in the reaction chamber is transmitted to the steering elements and becomes perceptive at the steering wheel as resistance or "feel." This arrangement is in contrast to that shown in the aforemention prior application and is a simplification of the prior arrangement.

Figure 2:
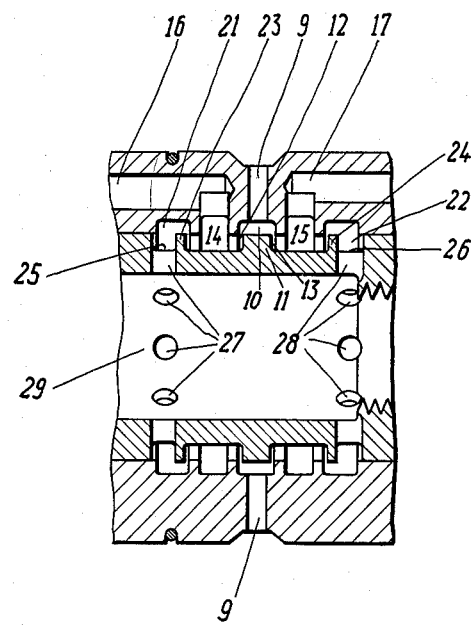

A detailed description of the invention will now be given in conjunction with the appended drawing in which:

Fig. 1 shows a longitudinal section through a power boost steering mechanism; and Fig. 2 shows magnified portions of certain elements illustrated in Fig. 1.

Referring now to the drawing, the invention comprises a casing 1 which serves as a pressure chamber, a double-acting power boost piston 2 reciprocally carried within the casing, a spool valve 3 reciprocally mounted interiorly of the piston, a steering rod 4 having a threaded connection with the valve 3, and a connecting link 5 on a steering shaft 6, which connecting link is actuated by the piston to operate the steering shaft, in a well understood manner.

The co-action between the valve and the piston is substantially the same insofar as oil pressure control is concerned as heretofore described in the prior application, and although not shown, the valve is restrained to longitudinal movement in the manner shown in the prior application when reciprocated by rotation of the steering rod, such reciprocation being effected by virtue of a threaded connection between the rod and the interior of the valve, all of which construction was disclosed and described in detail in the prior application and is not deemed necessary for the purposes of understanding the present invention.

The casing is provided with an inlet port 7 for oil pressure feed, which port communicates with the cylindrical interior 8 of the portion of the casing which forms a cylinder for the piston 2. Thus, a chamber 8 is formed, as shown in Fig. 1, by turning down the periphery of the piston a sufficient extent to effect a spacing between the turned down area and the casing walls. It will be noted that such chamber 8 exists in any position of the piston and effects a continuous, peripheral channel for pressure from inlet 7.

A plurality of bores 9 are provided throughout the piston in radial arrangement and communicate with an internally cut peripheral recess of channel 10 in the interior of the piston so as to feed oil under pressure to the channel. The channel 10 is generally concentric with a shoulder 11 provided on the valve 3 which shoulder is somewhat narrower longitudinally than the corresponding dimension of the channel. The co-action between the channel and the shoulder effects control of oil feed to one or the other of the cylinder ends. Thus, disposed at the sides of the shoulder, left and right respectively, are apertures 12 and 13, formed by suitable machining of the interior of the piston and it will be understood that relative movement of the valve and piston will enlarge one of these apertures while diminishing the other, whence oil pressure is directed in greater quantity toward one or the other of the piston ends by virtue of peripheral channels 14 and 15 respectively associated with apertures 12 and 13. The channels 14 and 15 are connected with respective channels 16 and 17 which comprise longitudinal bores in the piston and which bores lead to respective ends of the piston. Thus, bore 16 leads to the chamber 18 at the left end of the piston, while bore 17 leads to the chamber 19 at the right end of the piston. It will be noted that the area of the piston ends are unequal in exposure to oil pressure, the area in the piston 18 being larger than that in the chamber 19 because of the presence of piston sleeve 20 which jackets the steering rod. The unbalance due to these differences in areas is corrected by the present invention, as will be subsequently described. Channels for oil return are provided at 21 and 22, which channels are recessed into the interior face of the piston and wherein flow therefrom is controlled by means of respective narrow peripheral shoulders 23 and 24 carried by the valve 3. Thus, the channels 21 and 22 may either be closed by means of the respective peripheral shoulders 23 and 24 or they may be communicated with respective channels 14 and 15, depending on the shifting of the valve with respect to the piston. In Fig. 2 a neutral position is shown and it will be seen that the shoulders 23 and 24 do not block egress of oil from the return channels 21 and 22.

Additional channels 25 and 26 are peripherally provided in the surface of the valve 3 which communicate with respective channels 21 and 22, which channels 25 and 26 communicate with a hollow interior chamber 29 of the valve through a respective plurality of bores 27 and 28. The chamber 29 connects with an outlet bore 35, provided throughout the wall casing 1, by means of bores 31 and 32 shown in dotted lines and drilled into the steering rod 4, which bores communicate with a channel 33 provided by concentric spacing between the steering rod 4 and a sleeve which surrounds the rod and is carried in the piston sleeve 20; which channel 33 communicates with bores such as 34 in turn communicating with outlet 35.

A particular feature of the invention relates to an adjusting sleeve 41, carried on valve 3, and being threaded thereto by means of the threads 42. The sleeve 41 terminates in a narrow ring 44 which, to insure against relative rotation between the sleeve and the valve, can be mortised into the bores 30 of the valve after the valve has been set for balanced condition of the piston, that is, hydraulic center.

The chamber 8 connects to the interior chamber 46 of a reaction element 48 via bore 45, it being understood that a suitable passageway between the peripheral channel or chamber 8 is provided at the outer radial end of bore 45, as shown. Therefore, the chamber in reaction element 48 is always under inlet pressure. A reaction ring 47 is provided, carried on the adjusting sleeve 41, which ring is biased toward the left by means of springs 49 carried within the reaction element 48. A spacing 61 is thus effected between the reaction ring 47 and the reaction element 48 to provide a passageway for oil pressure into the interior chamber 46 of the reaction element. The springs 49 are provided in plurality and arcuately arranged within the reaction element so as to effect a uniform balanced bias on the reaction ring 47. The arrangement thus far described effects a combined pressure caused by oil pressure as well as spring pressure to produce a steering resistance for the rod 4 to work against, which is the manual steering component causing "feel."

As will be seen on Fig. 1, the reaction element 48 is a ring-like member having a hollow interior open in the direction of the ring 47, which hollow interior accommodates the plurality of springs 49 while at the same time effecting the reaction pressure chamber 46. In order to effect sealing, the ring 47 as well as the reaction element 48, which is in effect a spring cage, are provided with respective O-rings 50 and 51.

The reaction element 48 engages a shoulder 56 of the piston sleeve 20 adjacent the outer edge of its periphery, while the inner edge of the periphery of the reaction element abuts a retainer ring 58 which is carried on the adjustable sleeve 41. The reaction ring 47 engages a shoulder 59 of piston 2 which shoulder is effected by suitable machining of the interior of the piston as will be understood from Fig. 1. Reaction ring 47 also engages a shoulder 60 provided on the adjustable sleeve 41 as shown. The various shoulders engaged by the reaction ring 47 and the reaction element or spring cage 48 serve as limit stops, which determine the spacing 61, which spacing determines the relative position of the valve spool and its associated shoulders with respect to the piston and its associated channels. Thus, the shoulder 11 is biased and maintained in a hydraulically centered position somewhat toward the left with respect to the channel 10. Since oil is continually circulating, it will be apparent that there is a greater pressure drop of oil going toward the chamber 18 than there is going toward the chamber 19. Therefore, the pressure in chamber 19 is greater than that in 18 and this compensates for the lesser area of the right hand end of the piston as compared with the left hand end. The piston is thus hydraulically centered or balanced.

In steering, if the steering rod be turned so that the valve moves toward the left, the spring cage 48 is pushed, by means of the retaining ring 58, toward the left until it abuts the reaction ring 47 which is normally retained stationary relative the piston 2 by virtue of abutment with the shoulder 59. Thus, the spacing 61 is taken up, the springs being, of course, somewhat compressed in this action. Should the rotation of the steering rod be reversed so that the valve 3 moves toward the right, the reaction ring 47 is forced into movement in that direction by virtue of the shoulder 60 on the adjustable sleeve 41, the reaction ring, after taking up the spacing 61, then engaging the outer edges of the concentric portions of the spring cage 48. However, the spring cage, at its closed end being in engagement with shoulder 56 integral with the piston, cannot move except as the piston moves and thus motion of the reaction ring together with motion of sleeve 41 and piston 3 must cease. Therefore, the spacing 61 is the limit of travel of valve 3 with respect to piston 2 in either direction of motion of the valve as effected by rotation of the steering rod 4.

Accordingly, the construction and arrangement of the various bores, channels, and passages is such that when either of the apertures 12 or 13 is widened, the other being narrowed simultaneously, oil under pressure can move to a respective end of the piston while at the same time oil may exhaust from the other end of the piston.

In order to provide a hydraulic center, that is, a balance of pressure at both ends of the piston, the adjustable sleeve 41 may be shifted slightly by rotation with a suitable tool, so as to provide a lesser oil pressure acting at the left end component 62 of the piston. Thus, by means of a suitable tool acting in slots such as 63 shown in dotted lines in Fig. 1, the sleeve 41 may be threadedly adjusted so as to provide a normal off-centering of shoulder 11 with respect to channel 10, whence aperture 12 is normally narrower than aperture 13 so that a higher oil pressure exists in channel 15 than in channel 14. Accordingly, as hereinabove described, unequal pressure drops prevail and the greater pressure drop at the right hand end of the piston produces a balancing of forces acting on the piston to maintain it in a neutral or straight forward steering position.

In effecting the adjusting, sleeve 41 is fixed in position relative the piston by means of the reaction ring 47 and spring cage 48, while the valve is adjusted with respect to the piston by rotation of the adjusting sleeve.

Shifting of the valve requires a discharge connection between a chamber 65 effected by spacing between the valve and the adjustable nut 41, and a return chamber 66, which is effected by a bore 67.

From the foregoing description it will be apparent that I have achieved the objects of the invention in comparatively simple and practical ways. Various changes may be made; for example, for different steering transmission springs, such as 49 of different compression strengths, might be utilized. Various other changes may likewise be made. Accordingly, I do not seek to be limited to the precise illustrations herein given except as set forth in the appended claims.

I claim:

1. An auxiliary power steering device for motor vehicles comprising a housing defining two pressure chambers, a reciprocal, double-faced piston in said housing, each face being in a respective pressure chamber, said faces being of unequal size, a movable sleeve valve in said piston, a manually rotative steering rod operatively connected to said sleeve valve to effect said movement thereof upon rotation of said rod, said valve and piston having co-acting shoulders and channels to control fluid pressure at the piston faces for effecting movement of said piston in a selected direction, said shoulders and channels being relatively movable with respect to each other to effect differing flow passage areas in a neutral piston position to provide greater unit pressure at one face of said piston whereby difference in unit pressure at the faces of the piston maintains a neutral position of said piston, and means for maintaining said valve in a predetermined position to effect relative positions of said shoulders and channels so as to achieve a difference in flow passage areas for effecting equality of total pressures on the faces of said piston, when not effecting power steering.

2. In a power steering device as set forth in claim 1, said means comprising an adjustable sleeve intermediate said sleeve valve and piston.

3. In a power steering device as set forth in claim 1, said means comprising an adjustable sleeve intermediate said sleeve valve and piston, said sleeve being fixedly securable in an adjusted position to said sleeve valve and having predetermined, longitudinal, reciprocal movement with respect to said piston, the degree of said movement determining the limits of movement of said sleeve valve with respect to said piston.

4. In a power steering device as set forth in claim 1, said means comprising an adjustable sleeve secured to said sleeve valve and adjustable thereon in a longitudinal direction, said piston having spaced shoulders, resilient means carried by said sleeve and abutting said shoulders in opposite directions, said resilient means comprising elements engageable with each other to determine the limit of travel of said sleeve valve with respect to said piston in either longitudinal direction, wherein abutment of said latter elements with respective shoulders of said piston is operative to hold said sleeve normally fixed with respect to said piston when said sleeve valve is stationary, whereby said sleeve valve may be fixed at a predetermined position with respect to said piston when said sleeve valve is stationary.

5. In a power steering device as set forth in claim 1, said means comprising an adjustable sleeve secured to said sleeve valve and adjustable thereon in a longitudinal direction, said piston having spaced shoulders, resilient means carried by said sleeve and abutting said shoulders in opposite directions, said resilient means comprising elements engageable with each other to determine the limit of travel of said valve with respect to said piston in either longitudinal direction, wherein abutment of said latter elements with respective shoulders of said piston is operative to hold said sleeve normally fixed with respect to said piston when said sleeve valve is stationary, whereby said sleeve valve may be fixed at a predetermined position with respect to said piston when said sleeve valve is stationary, said adjustable sleeve and said sleeve valve having a threaded connection with each other for effecting adjustability.

6. In a power steering device as set forth in claim 1, said means comprising an adjustable sleeve threadedly carried on said sleeve valve, said sleeve being concentric with and surrounding said steering rod, a spring cage carried by said sleeve, a reaction ring carried by said sleeve, said spring cage and reaction ring being annular and being longitudinally spaced from each other, spring means carried by said spring cage and engaging said reaction ring to maintain said spacing, a shoulder carried by said piston and engageable by said reaction ring, another shoulder carried by said piston and engageable by said spring cage, a shoulder carried by said adjustable sleeve and engageable with said reaction ring, an additional shoulder carried by said adjustable sleeve and engageable with said spring cage whereby said adjustable sleeve is flexibly maintained in longitudinally fixed position with respect to said piston, and whereby said adjustable sleeve may be manually rotated to predetermine the position of said sleeve valve with respect to said piston.

7. In a power steering device as set forth in claim 1, said means comprising an adjustable sleeve threadedly carried on said sleeve valve, said sleeve being concentric with and surrounding said steering rod, a spring cage carried by said sleeve, a reaction ring carried by said sleeve, said spring cage and reaction ring being annular and being longitudinally spaced from each other, spring means carried by said spring cage and engaging said reaction ring to maintain said spacing, a shoulder carried by said piston and engageable by said reaction ring, another shoulder carried by said piston and engageable by said spring cage, a shoulder carried by said adjustable sleeve and engageable with said reaction ring, an additional shoulder carried by said adjustable sleeve and engageable with said spring cage whereby said adjustable sleeve is flexibly maintained in longitudinally fixed position with respect to said piston, and whereby said adjustable sleeve may be manually rotated to predetermine the position of said sleeve valve with respect to said piston, including means for effecting communication of oil pressure with said spring cage so as to maintain a manual force component in conjunction with the pressure effected by said spring means to afford resistance to rotation of said steering rod.

8. In a power steering device as set forth in claim 1, said means comprising an adjustable sleeve threadedly carried on said sleeve valve, said sleeve being concentric with and surrounding said steering rod, a spring cage carried by said sleeve, a reaction ring carried by said sleeve, said spring cage and reaction ring being annular and being longitudinally spaced from each other, spring means carried by said spring cage and engaging said reaction ring to maintain said spacing, a shoulder carried by said piston and engageable by said reaction ring, another shoulder carried by said piston and engageable by said spring cage, a shoulder carried by said adjustable sleeve and engageable with said reaction ring, an additional shoulder carried by said adjustable sleeve and engageable with said spring cage whereby said adjustable sleeve is flexibly maintained in longitudinally fixed position with respect to said piston, and whereby said adjustable sleeve may be manually rotated to predetermine the position of said sleeve valve with respect to said piston, said spring means comprising a plurality of individual, spaced springs arcuately arranged, said spring cage comprising a toroidal shaped member being open at one face to permit said springs to extend outwardly thereof and being provided with bores for retaining respective springs.

References Cited in the file of this patent

UNITED STATES PATENTS

| | | |
|---|---|---|
| 1,937,485 | Davis | Nov. 28, 1933 |
| 2,757,748 | MacDuff | Aug. 7, 1956 |
| 2,788,770 | Folberts | Apr. 16, 1957 |
| 2,837,167 | Loofbourrow | June 3, 1958 |
| 2,860,605 | Banker | Nov. 18, 1958 |